United States Patent Office 2,782,942
Patented Feb. 26, 1957

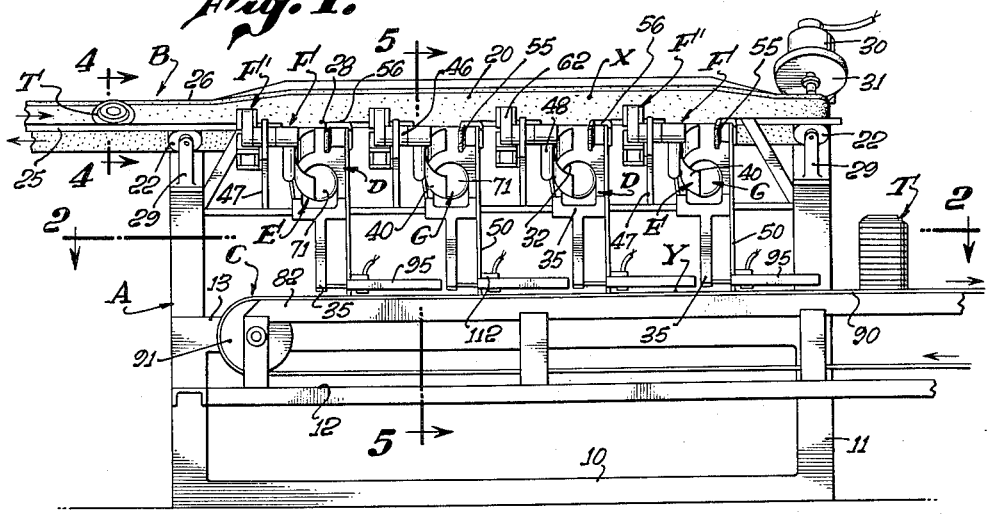

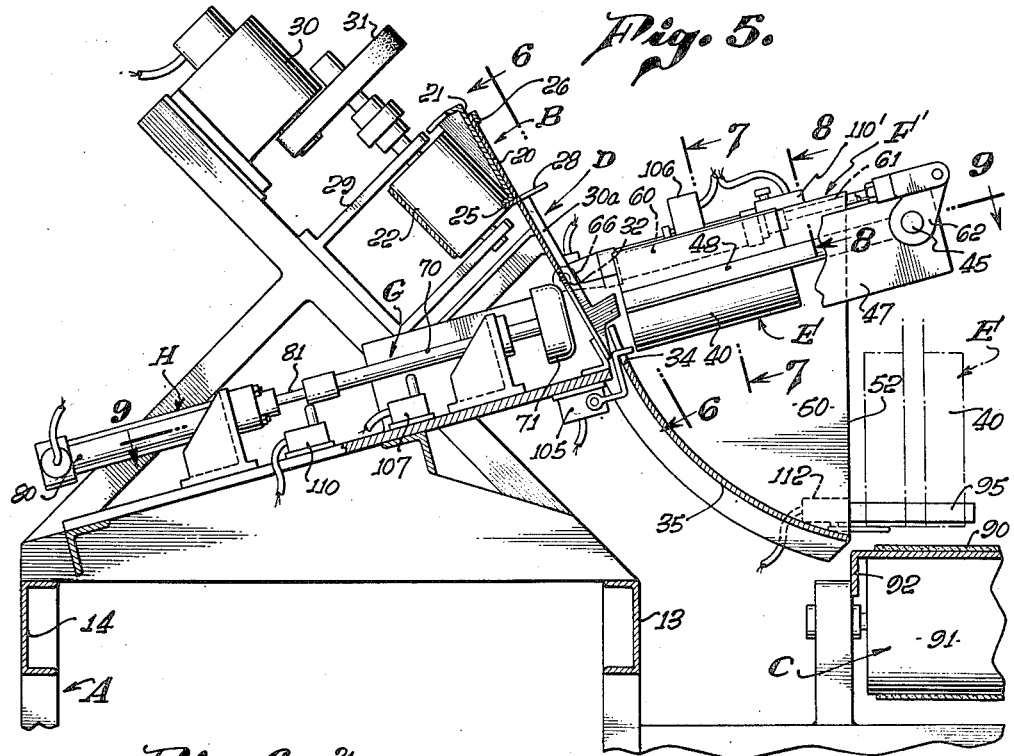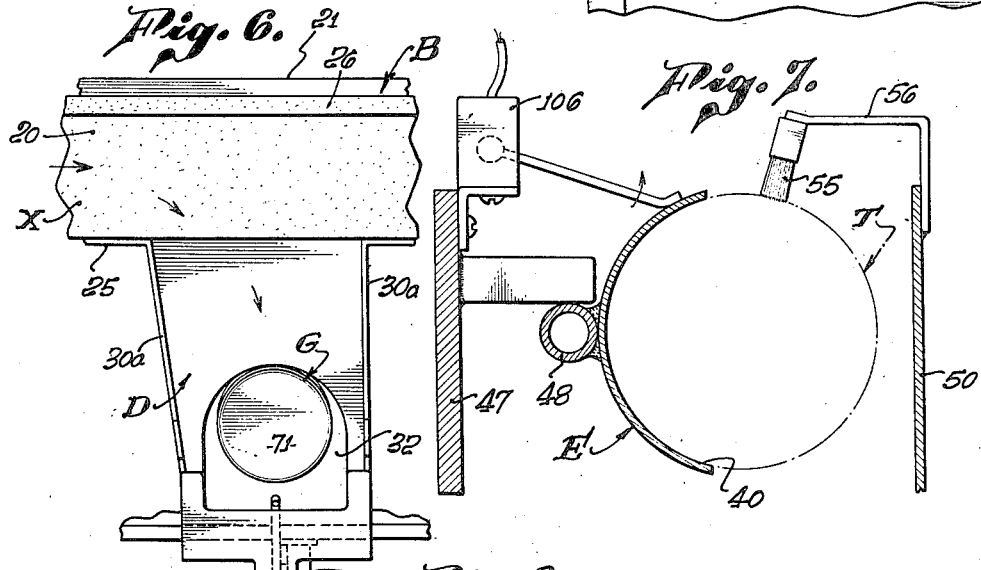

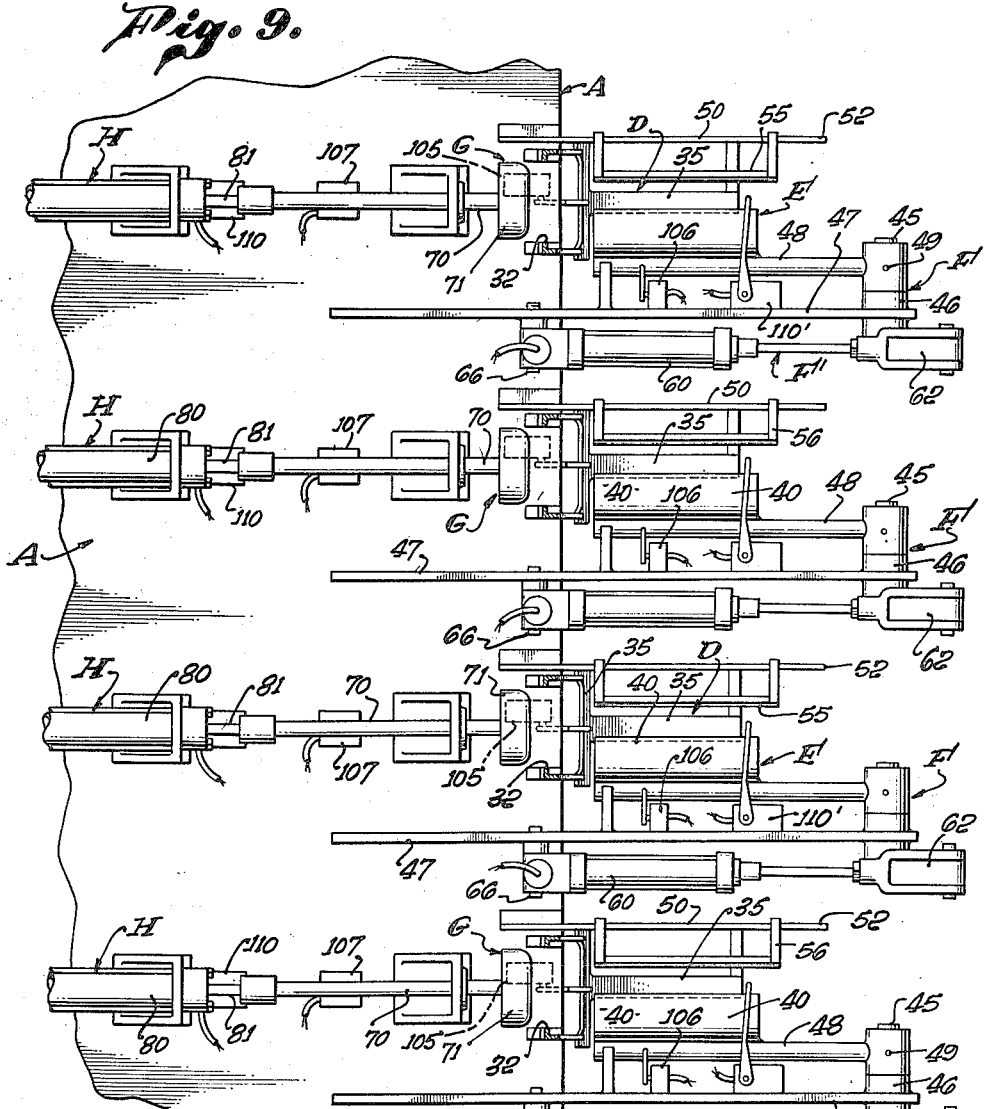
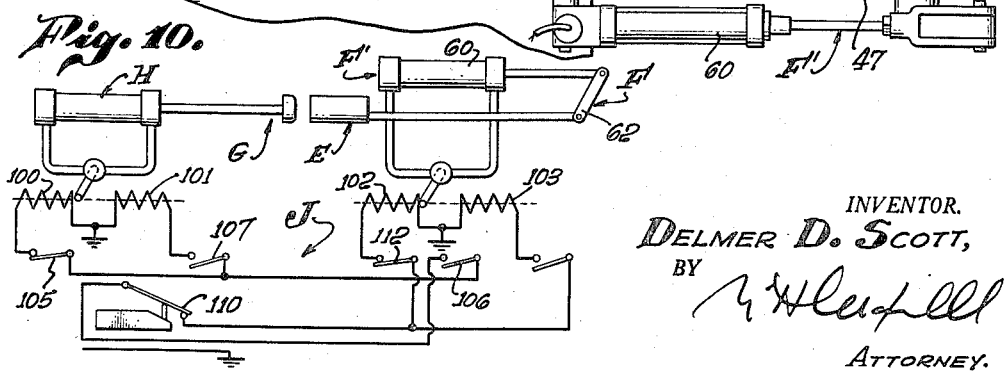

2,782,942
STACKING MACHINE

Delmer D. Scott, Encino, Calif., assignor to Nethercutt Laboratories, Los Angeles, Calif., a copartnership Application April 28, 1953, Serial No. 351,570

5 Claims. (Cl. 214—6)

This invention has to do with a stacking machine, and it is a general object of the invention to provide a simple, practical, dependable machine serviceable to handle articles or objects of various kinds and to stack or group them in a predetermined manner.

The machine provided by the present invention can be employed to handle or stack articles or objects of various kinds, and since it is particularly useful and practical for the handling and stacking of targets, it will be referred to as employed for the handling of such articles; however, it is to be understood that reference to targets is not to be in any way construed as limiting the scope of the invention or the range of use of the machine which is the subject of the invention.

Round concavo-convex articles or objects such as are employed as targets are like many other similar or comparable articles produced in quantity and for practical handling require stacking and packaging preferably in groups or stacks of a predetermined size. In the case of targets, the articles are produced by manufacturing equipment so that they are received by the machine of the present invention in a constant or continuous stream and at a substantial rate, and the machine of the present invention so handles the targets as to deliver them in stacks or in stacked relation with each stack containing a predetermined number of targets nested together, the stacks being vertically disposed and on a conveyor so that, as they are delivered from the machine, they can be readily packaged or wrapped or otherwise handled as circumstances may require.

It is a general object of this invention to provide a stacking machine suitable for handling targets, or the like, and which is such as to effectively and dependably handle a flow or targets from production equipment, or the like, and which serves to rapidly and accurately stack the targets into groups, each containing a predetermined number of targets, which stacks are delivered from the machine one after the other and so they can be effectively and rapidly handled for packaging or other handling.

It is a further object of this invention to provide a machine of the general character referred to characterized by a rail along which the targets, received by the machine are advanced, which rail has openings through which the targets are delivered to stackers, the passage of targets by the rail to a stacker occurring only when the stacker is unloaded and in position for receiving targets.

Another object of the invention is to provide a machine of the general character referred to wherein each stacker is characterized by a target receiver of such capacity as to receive a predetermined number of targets and such as to receive the targets one after the other until it is filled, whereupon it is operable from the receiving position to an unloading position where it delivers the stacked targets as, for instance, to a conveyor that carries the stacked targets away from the receiver.

Another object of this invention is to provide a machine of the general character referred to wherein a pusher is coordinated with delivery of targets for entry into the receiver, which pusher engages each target as it registers with the pusher and delivers the target into the receiver.

It is a further object of this invention to provide a machine of the general character referred to characterized by a stacker or stacking machanism adapted to receive targets one at a time and to deliver them in groups stacked in a predetermined manner, which mechanism is simple in form and construction, simple in action and such as to effectively, accurately and dependably handle delicate or fragile articles with a minimum of breakage.

The various objects and features of my invention will be fully understood from the following detailed description of a typical preferred form and application of my invention, throughout which description reference is made to the accompanying drawings, in which:

Fig. 1 is a front elevation of a machine embodying the present invention showing the machine in which targets are received at one end and from which the targets are delivered at the other end of the machine in stacked relation. Fig. 2 is a plane view of a portion of the machine, being a view taken substantially as indicated by line 2—2 of Fig. 1. Fig. 3 is a side elevation of a group or stack of targets as delivered by the machine with a portion of the stack broken away to illustrate the manner in which the targets are engaged one into the other or nested. Fig. 4 is an enlarged detailed sectional view taken as indicated by line 4—4 on Fig. 1. Fig. 5 is an enlarged detailed sectional view taken transversely through the machine, being a view taken as indicated by line 5—5 on Fig. 1. Fig. 6 is an enlarged plane view of a portion of the machine, being a view taken as indicated by line 6—6 on Fig. 5. Fig. 7 is an enlarged detailed sectional view of a portion of the machine, being a view taken as indicated by line 7—7 on Fig. 5. Fig. 8 is an enlarged detailed sectional view of a part of the machine, being a view taken as indicated by line 8—8 on Fig. 5. Fig. 9 is an enlarged plane view of a portion of the machine, being a view taken substantially as indicated by line 9—9 on Fig. 5 and Fig. 10 is a diagrammatic view illustrating the control system included in the machine as provided by the present invention.

The machine provided by the present invention and as shown in the drawings includes generally an elongate horizontally disposed frame A. A supply means B is provided in connection with the frame and is adapted to deliver targets, or the like, in a continuous series or steam preferably at one end of the machine which will be termed the receiving end of the machine. A plurality of like stacking mechanisms are included in the machine, being preferably arranged in a series lengthwise of the machine and each is adapted to receive targets from the supply means B and to deliver targets in stacked relation to a discharge means or conveyor C. The conveyor C is preferably arranged to extend lengthwise of the machine and to carry stacks of targets away from the machine at the discharge end thereof.

The several stacking mechanisms are preferably alike and each includes generally a chute D arranged to carry targets from the supply means B, a carrier E supported by a mounting means F to be movable between a position where it receives targets from the chute D and a position where it delivers stacks of targets to the conveyor C. The stacking mechanism further includes a means F serving to operate or move the carrier E, a ram G serving to move targets from the chute D into carrier E, operating means H for ram G and various other elements the details of which will be hereinafter described. In addition to the mechanical elements hereinabove mentioned, the invention provides a control means J, a typical form of which is illustrated in the diagram Fig. 10.

The frame A of the machine is preferably an elongate horizontally disposed unit of such size, form and construction as to adequately accommodate and carry the various other elements of the machine as will be apparent from consideration of the drawings. Considered generally, the frame A includes a footing 10 and standards 11 that project upward from the footing to carry a table 12 at the front of the machine where conveyor C is located and beams 13 and 14 rearward of the table to carry working parts of the machine as will be apparent from the drawings. In the particular case illustrated, the front and rear beams 13 and 14, respectively, extend lengthwise of the machine from one end to the other, and at each stacking mechanism, the beams 13 and 14 support the essential working parts of that mechanism as will be apparent from a consideration of Fig. 5 of the drawings.

In the general arrangement of essential elements as provided by the present invention, the supply means B is elongate in form and extends longitudinally of the frame A and is located so that the targets handled thereby are fed therefrom by the action of gravity, being handled by the chutes D as they pass from the means B to the mechanisms that stack them. The stacking mechanisms are located in an elongate series extending lengthwise of the frame and are of such number that when one mechanism is not ready to receive a target, being carried by the means B, that target advances lengthwise of the series of mechanisms until it reaches a mechanism ready to receive a target. The conveyor C extends lengthwise of the machine at the forward side or part thereof and is such as to receive stacks of targets from the stacking mechanism as the stacks are delivered by the mechanisms whether that be simultaneously or in succession.

The supply means B is preferably in the nature of a belt-type conveyor, and in the form shown in the drawings, it includes an elongate flexible belt 20 handled by a guide 21 and by rollers 22 so that it has a top portion extending horizontally and lengthwise of the machine from the receiving end thereof to the discharge end thereof as shown in Fig. 1 of the drawings. The belt is preferably an endless belt and it extends from the receiving end of the machine to a point where the targets are delivered onto it, and the targets received by the belt are carried by the belt and along the rail 25 that extends lengthwise of the belt. In the preferred arrangement, the top or target-carrying portion of the belt extends lengthwise of the machine and is pitched transversely thereof so that it extends upward and rearward from the rail 25 in a manner such as is clearly illustrated in Figs. 4 and 5 of the drawings. The guide 21 is an elongate structure arranged beneath the belt portion X to support it in the desired horizontal position and in the desired angular position as shown in Fig. 4. In accordance with the preferred form of the invention, the belt 20 is provided at the upper edge portion thereof with a ridge 26 that projects upwardly from the belt and which supports the upper edge portions of the targets T as their lower edge portions rest on the lower edge of the belt and against the rail 25. By thus supporting the targets which form a support as clearly illustrated in Fig. 4, the targets, instead of being driven along the rail 25 as the belt advances in the direction indicated by the arrow in Fig. 1, are rolled along the rail, there being a minimum of drag resisting free rolling of the targets as they advance lengthwise of the machine. The rail 25 is provided at suitable points lengthwise thereof with discharge openings 28, there being discharge openings in the rail 25 at or opposite each stacking mechanism.

It will be understood that the working parts of the supply means B, as hereinabove described, can be supported in any suitable manner from the frame A. In the case illustrated, the rollers 22 that carry the belt 20 and supported by suitable mounting brackets 29, and at least one of the rollers, is driven to effect the desired operation of the belt. In the drawings the roller 22 at the delivery end of the machine is shown driven by a suitable motor 30 through a drive mechanism 31.

The several stacking mechanisms included in the machine and arranged in a series lengthwise of the machine are preferably alike, and, therefore, the following detailed description of one of these mechanisms is applicable to each.

Each stacking mechanism, as provided by the present invention, is coupled with or related to the means B by a chute D, the chute being related to rail 25 to extend downward and forward therefrom at a point where the rail has a discharge opening 28. The discharge opening 28 in the rail 25 is of such width that if the chute D is unoccupied, a target advancing along the means B will drop by gravity from the rail through the opening 28 to the chute. The chute may in practice be a simple flat element extending downward and forward from the track and may, as desired, have side flanges 30ª serving to prevent displacement of targets therefrom as they moved by gravity from the rail to the lower end portion of the chute.

The chute is provided in its lower end portion with an opening 32 which is of substantial size but not large enough to pass a target T. The lower end of the chute D terminates at or close to the upper end 34 of an arcuate guide 35 which is related to carrier E as will be hereinafter described. The parts are related so that a target T received by chute D moves downwardly along the chute to a predetermined position in register with opening 32 in which position it is stopped by the upper end of the guide 35.

The guide E provided by the present invention is adapted to receive targets from the chute D, and as the machine operates, it will receive targets one at a time until it has received a predetermined number of targets whereupon it is shifted or operated so that it moves away from the chute and to a position adjacent the discharge conveyor C so the targets disposed in it are carried from the chute to conveyor C to be disposed thereon and conveyed away thereby.

In the preferred form of the invention, the carrier E is an elongate unit carried by the mounting means F so that it swings or pivots between positions above described, and it is open in its outer or receiving end and at one side, namely, the side facing in the direction that the stacked targets are carried from the machine by conveyor C. In the case illustrated, the carrier E is formed so that it has a concave inner side or seat 40 that extends lengthwise of the carrier and inward of the carrier from its open outer or terminal end. The concave seat 40 of the carrier preferably conforms more or less closely to the shape of the targets, being handled, for instance, where the targets are round as shown in the drawings, the seat 40 is correspondingly shaped or curved and in the construction illustrated, the set extends through slightly less than 180 degrees. As a result of this construction or formation of the carrier, the carrier is, in effect, an elongate trough into which the targets are forced or fed by the pusher as will be hereinafter described.

The present invention provided the mounting means F to pivotally carry or mount the carrier E so that the carrier swings about a center or axis which extends longitudinally of the machine, which is located above the discharge conveyor C and is related to the other essential elements as shown in the drawings. In the particular case illustrated, the means F includes a shaft 45 carried by a bearing 46 supported by a rigid web 47 which in turn is supported in fixed position by the frame A. In the construction illustrated, the carrier as above described has an arm 48 fixed to it and projecting from it to the shaft 45, the arm being affixed to shaft 45 as by means of a pin 49 or the like.

The guide 35 hereinabove mentioned is supported by the frame A so that it is in a fixed position and it is curved or arcuate in form being concentric with the shaft 45 and it is located to occur immediately beyond the outer or terminal end of carrier E so that as the carrier E moves from the loading position, shown in full lines in Fig. 5, to the unloading position, shown in dotted lines in Fig. 5, targets in the carrier will not drop or be discharged therefrom at the outer or terminal end thereon. It will be noticed in the drawings and particularly from a consideration of Fig. 5 of the drawings, that the guide 35 extends from the lower or terminal end of chute D to the receiving edge portion of conveyor C so that targets are effectively retained in the carrier as the carrier swings between the positions mentioned.

The invention further provides a retainer 50 which is related to the carrier E so that targets will not discharge from the open side of the carrier as it swings from the loading to the unloading position. The retainer, as shown in the drawings, is a simple, flat, vertical, disposed plate located opposite and suitably spaced from the concave seat 40. The retainer is of such extent relative to the guide 35 as to be effective in checking displacement of targets from the carrier as the carrier moves toward the conveyor C; however, the retainer has an end 52 past which the carrier moves in reaching its discharge position at carrier C so that the targets are free to leave or pass the retainer as they are dispositioned on the conveyor. Further, it is preferred that the retainer 50 be provided with a flexible portion or section 55 which engages and holds the targets in the carrier E as they are stacked therein. In the construction illustrated, the retainer section 55 is in the form of an elongate brush that extends lengthwise of the carrier E when the carrier is in loading position, the brush being carried by suitable supporting brackets 56 and being located so that it is effective in holding the targets stacked and against the seat 40 while the carrier E is in loading position.

The operating means F' provided by the present invention serves to swing or operate the carrier E between the positions above described. In the preferred form of the invention the means F' is a fluid pressure actuating means, and, as shown in the drawings it includes a cylinder 60 carrying a piston having a rod 61 that projects from the cylinder and which connects with a crank arm 62 on shaft 45. The cylinder 60 is secured to frame A by a pivot pin 66. In the particular case illustrated, the pivot pin 66 is carried by the web 47. The mechanism just described is proportioned so that when fluid under pressure is applied to it to operate it to one extreme position, the carrier E is operated to the loading position shown in full lines in Fig. 5 whereas it is operated to the opposite position, the carrier is operated to the unloading position shown in dotted lines in Fig. 5.

The ram means G is carried by frame A and includes a ram 70 mounted to reciprocate and arranged so that it is concentric with the carrier E when the carrier is in the loading position as shown in Fig. 5. The ram 70 is provided with a head 71 adapted to be operated through the opening 32 in chute D and the ram 70 is adapted to be operated from a retracted position as shown in Fig. 5 to an extended position where the head 71 as operated through opening 32 to engage a target at the lower end of the chute and move that target into the carrier E leaving clearance at the lower end of the chute for reception of the next target being handled by the chute.

The means H provided for operating the ram 70 is preferably a fluid pressure actuated means, and in the case illustrated, it includes a cylinder 80 suitably mounted in the frame A and carrying a piston which operates a rod 81 which connects to and operates the ram 70.

The discharge conveyor C is preferably a belt-type conveyor and in the drawings it is shown as including a belt 90 carried by suitable rollers 91 and guides 92 so that it has a horizontally disposed portion extending lengthwise of the machine at the front thereof and in a position to be immediately beneath the outer or discharged end of the carrier E when the carrier is in the unloading position shown in dotted lines in Fig. 5. The particular conveyor C illustrated in the drawings is driven continuously by suitable drive means brackets so that it operates at a suitable speed and it is continued from the discharge end of the machine to any suitable point remote from the machine.

In accordance with the present invention, it is preferred to provide a deflector 95 in the path of stack of targets as it is carried from carrier E by the conveyor C. It is prefererd in practice that the belt 90 of conveyor C be of substantial width and the deflectors 95 of the several stacking mechanisms are such as to deflect the stacks of targets from the receiving edge portion of the belt to the central portion thereof as will be understood from a consideration of Fig. 2 of the drawing.

In accordance with the present invention, the control system J is an electrical control system and control valves of the fluid pressure actuated mechanism F' and H are under control of electromagnetic actuators. The fluid pressure actuated mechanism of means H has a valve under control of an electromagnetic actuator 100 and a second electromagnetic actuator 101 while the valve of the fluid pressure actuated mechanism of means F' is under control of an electromagnetic actuator 102 and an electromagnetic actuator 103. The several electromagnetic actuators are in a control circuit as shown in Fig. 10, and this circuit includes a switch 105 operated by a target as the target reaches the lower end of chute D and is ready to be operated upon beyond ram means G. The switch 105 is in series with a switch 106 operated by the carrier E, the switch 106 being operated by carrier E when the carrier is in loading position so that switch 105 operated by the target is effective only when the carrier E is ready to receive the target. Operation of the switches 105 and 106 effects operation of the actuating means 100 which results in operation of means H so that the ram 70 is operated causing head 71 to engage in the target and advance it into carrier E. When the ram has reached the forward end of its stroke, switch 107 is operated with consequent energization of the operating unit 101 so that the mechanism of means H are reversed. The switches 106 and 107 may be snap switches which operate momentarily when operating as hereinabove described. A switch 110' is operated by the plunger 70 when the plunger is retracted and is in series with switches 102 and 103 so that the receiver can not be operated by means F' except when the plunger is retracted and switch 110 operated.

When a predetermined number of targets T have been delivered into carier E, the group or pile of targets in the carrier operating switch 110 which causes energization of the actuating unit 102 so that means F' goes into action and moves the carier E from the charging to the discharging position. As the carrier E reaches the discharging position where it is over conveyor C, the stack of targets is disposed on the conveyor and immediately moves away from carrier E and in so doing, it operates switch 112 which results in energization of operating unit 103 so that mechanism F' is reversed and the carrier E moved back to the loading position.

From the foregoing description it will be apparent that as targets are advanced by the supply means B, they will drop through the openings in the track 25, and in the case of each stacking mechanism, a predetermined number of targets may accumulate in the chute D before the carrier E of that mechanism is in place making the mechanism ready for charging. When any one chute D is thus occupied with targets, the targets handled by means B advance lengthwise of the machine until they find or reach the mechanism where the chute D is unoccupied, in which case they drop into that chute.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A machine adapted to deposit stacks of a predetermined number of articles onto a continuously moving discharge conveyor, including, an elongate frame, a plurality of like stacking mechanisms in a series lengthwise of the frame, supply means adapted to supply articles one after another lengthwise of the frame and to discharge them by gravity one at a time to said mechanisms, the said discharge conveyor extending lengthwise of the frame and adapted to receive vertically disposed stacks of articles from said mechanisms and to move them lengthwise of the machine for discharge therefrom, each mechanism including, a pivotally mounted receiver open at its outer end and open at one side and in the direction that the conveyor moves, means adapted to swing the receiver transversely of the frame and conveyor between a loading position where it receives articles delivered by gravity from the supply means and an unloading position where it is vertically disposed and deposits the stack of articles on the conveyor to be carried by the conveyor away from said open side of the receiver, and a retainer adjacent the open side of the receiver and retaining articles in the receiver as it swings from the loading to the unloading position.

2. A machine adapted to deposit stacks of a predetermined number of articles onto a continuously moving discharge conveyor including, an elongate frame, a plurality of like stacking mechanisms in a series lengthwise of the frame, supply means adapted to supply articles one after another lengthwise of the frame and to discharge them by gravity one at a time to said mechanisms, the said discharge conveyor extending lengthwise of the frame and adapted to receive vertically disposed stacks of articles from said mechanisms and to move them lengthwise of the machine for discharge therefrom, each mechanism including, a pivotally mounted receiver open at its outer end and open at one side and in the direction that the conveyor moves, means adapted to swing the receiver transversely of the frame and conveyor between a loading position where it receives articles delivered by gravity from the supply means and an unloading position where it is vertically disposed and deposits the stack of articles on the conveyor to be carried by the conveyor away from said open side of the receiver, and a ram adapted to engage the articles and feed from transversely of the frame and into the receiver when the receiver is in said loading position.

3. A machine adapted to stack articles including, an elongate frame, a plurality of like stacking mechanisms in a series lengthwise of the frame, supply means adapted to supply articles one after another lengthwise of the frame and to discharge them by gravity one at a time to said mechanisms, and a discharge conveyor extending lengthwise of the frame and adapted to receive vertically disposed stacks of articles from said mechanisms and to move them lengthwise of the machine for discharge therefrom, each mechanism including, a pivotally mounted receiver open at its outer end and at one side, means adapted to swing the receiver between a loading position where it receives articles delivered by gravity from the supply means and an unloading position where it is vertically disposed and deposits articles on the conveyor, an arcuate guide concentric with the pivotal axis of the receiver and retaining articles in the receiver as it operates from the loading to the vertical unloading positions, a retainer adjacent the open side of the receiver and retaining articles in the receiver as it moves from the loading to the unloading position, and a ram adapted to engage the articles and feed them into the receiver.

4. In a machine for stacking a predetermined number of articles onto a continuously moving discharge conveyor, a chute adapted to deliver articles by gravity and one at a time, a receiver pivotally supported to swing transversely of the said conveyor and having an open outer end and an open side facing in the direction that the conveyor moves, the receiver being adapted to swing from a substantially horizontal loading position adjacent the chute to a vertical unloading position removed from the chute where the stack of articles is free to be carried away from the receiver, an arcuate guide adjacent the outer end of the receiver and arranged concentric with the pivotal axis of the receiver and adapted to hold articles in the receiver as it moves transversely from the loading to the unloading position, and a plunger adapted to engage articles in the chute and feed them transversely of the frame and into the receiver when the receiver is in the said loading position.

5. In a machine for stacking a predetermined number of articles onto a continuously moving discharge conveyor, a chute adapted to deliver articles by gravity and one at a time, a receiver pivotally supported and having an open outer end and an open side facing in the direction that the conveyor moves, the receiver being adapted to swing from a substantially horizontal loading position adjacent the chute to a vertical unloading position removed from the chute where the stack of articles is free to be carried away from the receiver, an arcuate guide adjacent the outer end of the receiver and arranged concentric with the pivotal axis of the receiver and adapted to hold articles in the receiver as it moves transversely from the loading to the unloading position, a retainer adjacent the open side of the receiver adapted to retain articles in the receiver as it moves transversely from the loading to the unloading position, and a plunger adapted to engage articles through a lateral opening in the chute and feed them transversely of the frame and into the receiver when the receiver is in the said loading position.

References Cited in the file of this patent

UNITED STATES PATENTS

| | | |
|---|---|---|
| 1,435,263 | Soubier | Nov. 14, 1922 |
| 1,815,029 | Albertoli | July 21, 1931 |
| 2,170,288 | Kiss | Aug. 22, 1939 |
| 2,205,059 | Clark | June 18, 1940 |
| 2,508,698 | Von Beren | May 23, 1950 |
| 2,555,602 | Nutt | June 5, 1951 |
| 2,645,328 | Winters | July 14, 1953 |
| 2,648,419 | Detrez | Aug. 11, 1953 |